United States Patent [19]

Takahashi

[11] 3,786,428

[45] Jan. 15, 1974

[54] PATTERN CLASSIFICATION EQUIPMENT

[75] Inventor: Kousuke Takahashi, Tokyo, Japan

[73] Assignee: Nippon Electric Co., Ltd., Tokyo, Japan

[22] Filed: June 1, 1972

[21] Appl. No.: 258,693

[30] Foreign Application Priority Data

June 2, 1971 Japan .............................. 46-38802

[52] U.S. Cl. 340/172.5, 340/174 TF, 340/146.3 AQ

[51] Int. Cl. .............................................. G06k 9/10

[58] Field of Search .................. 340/172.5, 146.3 T, 340/146.3 MA, 146.3 Q, 146.3 AG, 174 TF

[56] References Cited

UNITED STATES PATENTS

| | | | |
|---|---|---|---|
| 3,165,718 | 1/1965 | Fleisher | 340/146.3 |
| 3,317,901 | 5/1967 | Clapper | 340/172.5 |
| 3,483,512 | 12/1969 | Atkins | 340/146.3 |
| 3,508,225 | 4/1970 | Smith | 340/174 |
| 3,573,730 | 4/1971 | Andrews et al. | 340/146.3 |
| 3,623,015 | 11/1971 | Schmitz et al. | 340/172.5 |
| 3,626,368 | 12/1971 | Lee | 340/146.3 F |
| 3,638,208 | 1/1972 | Chow | 340/174 TF |
| 3,651,459 | 3/1972 | Hahn | 340/146.3 WD |
| 3,668,667 | 6/1972 | Copeland | 340/174 TF |
| 3,678,287 | 7/1972 | Chow | 307/88 LC |

*Primary Examiner*—Paul J. Henon
*Assistant Examiner*—James D. Thomas
*Attorney*—Richard C. Sughrue et al.

[57] ABSTRACT

A pattern classification system responds to an n-dimensional binary pattern and classifies the pattern in accordance with previously stored weighting coefficients. The n-dimensional pattern is multiplied by positive and negative weighting coefficients to form a sum which is a measure of the similarity of the pattern to a known pattern for which the weighting coefficients are selected. Magnetic domain storage and logic circuits are used to store the weighting coefficients and form the sum.

12 Claims, 11 Drawing Figures

PATTERN CLASSIFICATION EQUIPMENT

BACKGROUND OF THE INVENTION

This invention relates to pattern recognition equipment and, more particularly, to pattern classification equipment forming a main constituent element of the recognition equipment.

With the remarkable progress achieved recently in the field of the information handling systems using various computers as the central processing units, there has been a demand for the development of pattern recognition equipment capable of providing rapid input of information to the information handling systems.

Characters, symbols, figures, and human voices are generally called "patterns." For example, the legibility of characters corresponds to the recognizability of a category to which a particular pattern belongs. Such classifying work is easy for a man to carry out but very hard for computers. Pattern recognition equipment is required as an aid for accomplishing this task.

Pattern recognition equipment for a specific use has already been developed and is known as the OCR. The OCR equipment for which the number of classes or categories to be classified is restricted to a dozen or so, has been developed and placed on market. However, the extension of such OCR techniques to the development of character recognition equipment capable of recognizing as many as several thousand characters presents very difficult problems.

The composition of the present-day OCR equipment is divided into four means as follows:

1. Document feeding means;
2. Optical observing means;
3. Recognition means; and
4. Control means.

The document feeding means sets every sheet of documents in a position within the coverage of the observing means, such as an optical scanner. The characters printed in the designated locations are scanned by the observing means. The observing means effectively divides the character area into a mesh or a matrix of smaller areas and develops a signal for each mesh representing the brightness of the mesh. In this manner a binary pattern signal is developed representing each scanned character. Each binary component represents the "brightness" of one mesh area. The recognition means compares the pattern signal with a reference mask pattern and produces an output representing the class designation of the reference pattern which best matches the pattern signal. The control means controls the operations of the feeding means, optical observing means, and the recognition means.

In the recent OCR equipment, document feeding means (1); optical observing means (2) and recognition means (3); and control means (4) occupy well-balanced proportions in the manufacturing cost. However, with the increase in the number of the input characters and hence, in the number of meshes, means (2) and (3) occupy the largest portions in the cost. The present invention is closely related to the means (2) and (3). Therefore, a description of the conventional means will be given with particular reference to these means (2) and (3).

In FIG. 1 which shows a simplified diagram of the above-mentioned optical observing means, a part 2 to which a character or an input pattern is applied is divided into nine meshes, and the brightness on each mesh is converted into an electrical signal one after another by the means 1. Also, the electrical signal is converted into a binary electrical signal ($x_1$, $x_2$, . . . , and $x_9$) depending on whether the brightness exceeds the mean brightness or not. The binary electrical signals are sent to a shift register 3. A sequence of electric signals $x_1$, $x_2$, . . . , and $x_9$ produced as outputs at successively predetermined time intervals from the means 1 forms a 9-dimensioned time sequential pattern. As soon as the binary electrical signals are sequentially set in flip-flops 4 of the register 3, the time sequential pattern is converted into a spatial pattern. In such a manner, an input pattern X=($x_1$, $x_2$, . . . , and $x_n$) is set in the register 3. The most primitive recognition method for the input pattern X is to first prepare a number of mask patterns representing sorts or classes and to calculate which one of the mask patterns coincides with the input pattern X. Of course, the mask patterns corresponding to black portions and those to white portions are separately prepared. In addition, the calculation for deciding the degree of coincidence for these black and white portions is performed separately, and the results of the calculation are put together. Incidentally, the state dependent variable or the weighting coefficient for each component of the mask pattern is a binary value 1 or 0, or in other words, the same as a value taken by the state-dependent variable for each component of the input pattern X. As a result, the calculation for the determination of coincidence can be attained by using simple logic circuits such as AND, OR, etc.

In the recent recognition methods, improved on the basis of above-mentioned principles, the statistical processing method is adopted due to the necessity of taking into consideration the incompleteness of the input pattern and spots and voids of characters. In other words, in the recognition method, the similarity is determined in place of the coincidence. Since the state-dependent variable for each component of the mask pattern takes a value between 0 and 1, the resultant mask pattern is referred to as "the weight vector."

In general, the weighting coefficient $w_{ij}$ for the $i$-th component of the weight vector $W_j$ of the $j$-th class should be so set as to indicate the occurrence probability for a case where the state-dependent variable $x_i$ for the $i$-th component of the input pattern X belonging to the $j$-th class is 1. Consequently, the occurrence probability of the case where the state-dependent variable $x_i$ for the $i$-th component of the pattern X belonging to the $j$-th class is 0 becomes $(1-w_{ij})$.

The weight vector corresponding to the $j$-th class can be divided into a positive weight vector $W_j$ having the components $w_{ij}$ and a negative weight vector $(\mathbf{1}-W_j)$ having the components $(1-w_{ij})$, wherein $i$ denotes an integer 1 through $n$ and $j$, an intger 1 through $m$, while all components of vector $\mathbf{1}$ are 1. Moreover, $n$ represents the number of components for the pattern X (dimensional number) and $m$ represents the number of weight vectors or classes.

In order to determine the class to which the pattern X belongs, the degree of similarity obtainable by computing the inner product of the input pattern X and the weight vector is derived from weight vectors and the class designation for the weight vector of the largest degree of similarity is displayed. Incidentally, it is to be noted here that the similarity cannot be derived solely from the inner product of the pattern X and the weight vector $W_j$.

Assuming now that the positive vector $W_j$ is expressed as $$W_j=\begin{pmatrix}0.3\\0.8\\0.1\\0.9\\0.2\end{pmatrix}$$

and a first input pattern $X_1$ is expressed as $$X_1=\begin{pmatrix}0\\1\\0\\1\\0\end{pmatrix},$$

the inner product of $W_j$ and $X_1$ is given by $0.3\times0+0.8\times1+0.1\times0+0.9\times1+0.2\times0=1.7$.

On the other hand, assuming that a second input pattern $X_2$ is expressed as $$X_2=\begin{pmatrix}1\\1\\1\\1\\1\end{pmatrix},$$

the inner product of $W_j$ and $X_2$ becomes 2.3 in a similar computation. According to this result of the computation, 2.3 is larger than 1.7. Therefore, it is determined that the pattern $X_2$ is the most similar to the typical pattern of the *j*-th class. Visually, however, the pattern $X_1$ may be much more similar to the typical pattern of the *j*-th class than the pattern $X_2$. For this reason, it is appreciated that the negative weight vector $(\mathbf{1}-W_j)$ should be taken into consideration. The negative weight vector is given by $$1-W_j=\begin{pmatrix}1.0\\1.0\\1.0\\1.0\\1.0\end{pmatrix}-\begin{pmatrix}0.3\\0.8\\0.1\\0.9\\0.2\end{pmatrix}=\begin{pmatrix}0.7\\0.7\\0.9\\0.1\\0.8\end{pmatrix}$$

In computing the similarity, the inverted input pattern $\overline{X}_1$ must be introduced, which is expressed as $$\overline{X}_1=\begin{pmatrix}1\\0\\1\\0\\1\end{pmatrix}.$$

Likewise, the inverted second input pattern $\overline{X}_2$ expressed as $$\overline{X}_2=\begin{pmatrix}0\\0\\0\\0\\0\end{pmatrix},$$

is introduced.

The inner product of $\overline{X}_1$ and $(\mathbf{1}-W_j)$ is given by $0.7\times1+0.2\times0+0.9\times1+0.1\times0+0.8\times1=2.4$, whereas the inner product of $\overline{X}_2$ and $(\mathbf{1}-W_j)$ is given by $0.7\times0+0.2\times0+0.9\times0+0.1\times0+0.8\times0=0$.

In this case, 2.4 is evidently larger than 0, with the result that the pattern $X_1$ is decided to be closer to the typical pattern of the *j*-th class than the pattern $X_2$.

The computation results for the positive and negative weight vectors are put together. More specifically, the two inner products for the first input pattern are 1.7 and 2.4, and the sum is 4.1. The two inner products for the second input pattern are 2.3 and 0, and the sum is 2.3. Comparing the two sums 4.1 and 2.3, it is determined that the first input pattern is more similar to the *j*-th mask pattern. This decision is consistent with our visual judgment.

As a result, the similarity between the input pattern X and the typical pattern of the *j*-th class is obtained from equation:

$$X * W_j+\overline{X} * (\mathbf{1}-W_j),$$

where the asterisk * denotes the operational notation for the inner product.

Various methods have been proposed for deciding the weighting coefficient for each component of the positive or the negative vector of each class. For instance, a method for deciding weighting coefficients by learning from a number of training patterns is set forth in a book titled "LEARNING MACHINES" by Niles J. Nilsson, published by the McGraw-Hill Book Company in 1965. Furthermore, in a paper titled "State of the Art in Pattern Recognition" published in PROCEEDINGS OF THE IEEE, Vol. 56, No. 5, 1968, pages 836 through 862, it is discussed how the weighting coefficients should be decided for the best pattern classification performance.

At any rate, the weighting coefficients can be easily derived from computers by using the formulae, even if only a portion of the statistical properties of the patterns to be applied to the OCR equipment is known.

FIG. 2 shows a diagram of the recognition means used in a conventional OCR equipment. This means itself may be employed as a pattern classification equipment other than the OCR equipment.

A time sequential input pattern X supplied from the observing means 1 of FIG. 1 is set in the shift register 3, wherein the *i*-th component $x_i$ of the input pattern X is either 1 or 0. The flip-flops 4 as the constituent elements of the register 3 store the state-dependent variables for the components of the pattern X. Resistors 5 connected to these flip-flops 4 have resistance values corresponding to the weighting coefficients. An operational amplifier 7 and a resistor 6 are used for increasing the operational function so that $$x_1 \times R_{11}/R_{01} + x_2 \times R_{21}/R_{01} + x_3 \times R_{31}/R_{01} + \ldots + x_9 \times R_{91}/R_{01}$$

is produced as an output from a terminal 8 of the amplifier 7.

If $w_{ij}$ corresponds to $R_{ij}/R_{oj}$, the inner product of X and $W_j$ can be computed. Herein, the inner product of an inverted input pattern $\overline{X}$ and a negative weight vector $(\mathbf{1}-W_j)$ can be computed by the same circuit as the one shown in FIG. 2.

As a practical matter, such a circuit has been employed in the conventional OCR equipment, since the circuit has simple structure and is readily made in the form of an integrated circuit. However, in this circuit, the following disadvantages are inevitable. First, it is impossible to alter the weight vector, and the operation of the circuit becomes inaccurate and the wiring of the circuit becomes complicated with the increase in the number of components of the input pattern.

In order to solve these problems, a digital memory having the function of a read only memory is adopted in the recently developed OCR equipment in place of the resistance circuit. In this case, each component $w_{ij}$ of the weight vector is stored discretely. Therefore, an integer $w_s$ larger than 1 is used in place of 1, that is, $w_s$ is used as vector 1. Thus, the computation accuracy is greatly improved.

However, in cases where patterns having large dimensional numbers or class numbers, such as the Chinese characters, are classified, various contrivances are needed in addition to the digital memory.

Some problems in the recognition of the Chinese characters are disclosed in a paper titled "Recognition of Printed Chinese Characters" in IEEE Transactions on ELECTRONIC COMPUTERS, Vol. 15, No. 1, Feb. issue, 1966.

FIG. 3 shows representative circuit structure of the conventional pattern classification equipment. Small-scale equipment of this type has been adopted as the recognition means of the conventional OCR equipment.

In FIG. 3, all weight vectors are stored in a digital memory 9 of the random access type. One or two weighting coefficients per word are stored in the memory 9. In response to a command from a control unit 13, positive and negative weight vector components of each class are supplied to a shift register 10 for the positive weight vector and a shift register 11 for the negative weight vector. As soon as the input pattern is set in the shift register 3, the degree of similarity is computed for every component. More specifically, $x_i \cdot w_{ij}$ and $\bar{x}_i \cdot (w_s - w_{ij})$ are calculated with respect to the $i$-th component $x_i$, (1 or 0), of the input pattern X and the sum of these products is stored in the register 12 for every component. Thus, the computation results of all the components are set in the register 12, they are summed up by an adder 16. The summation result corresponds to the computation result of $$X * W_j + \bar{X} * (W_s - W_j)$$

and is normally called the weighted sum. The weighted sum is converted into a binary signal by a quantizer 17 and the binary signal is given to the control unit 13.

When the degree of similarity is large and the weighted sum is in excess of a certain threshold value, the output of the quantizer 17 is 1, whereas the output is 0 when the weighted sum is below the threshold value.

The control unit 13 stores the output of the quantizer 17 and the address selected in the memory 9 in a one-to-one correspondence.

Weight vectors $W_j$ and $W_s - W_j$ for each input pattern corresponding to various classes are read out in succession from the memory 9, the weighted sum is computed, the weighted sum is converted into 1 or 0 by the quantizer 17, and the quantized output is stored in the control unit 13. The designation of a class or category to which the input pattern belongs can be decided depending on a sequence of arrangement of 1 and 0 in the output of the quantizer 17. As a result, the decision regarding the class designation for the input pattern is generated from a terminal 14. Immediately after this decision is made, the conrol unit 13 causes the observing unit 1 and the digital memory 9 to be reset to the initial state and produces a command for permitting the acceptance of a new input pattern. The shift registers 10, 11 and 12 are reset every time the processing of the weight vector $W_j$ output from the memory 9 has been completed and thereafter, they are set upon receipt of a new weight vector $W_j$.

Such a conventional OCR equipment has the following disadvantages:

1. When the number of the weight vectors $W_j$ or dimensions $n$ of the input pattern is increased, both the memory capacity of the core memory 9 and the time interval required for scanning all addresses become extraordinarily large; (2) With the increase in the number of bits for each weighting coefficient $w_{ij}$, the memory capacity of the shift registers 10, 11 and 12 is greatly increased. For instance, in the conventional OCR equipment capable of reading Chinese characters of the order of 3000, even if various contrivances are made for restricting the number of the weight vectors $W_j$ (mask patterns) within $10^4$, the number of the dimensions within $10^3$, and the number of bits of each weighting coefficient less than 4, still a digital memory 9 having a capacity of $8 \times 10^7$ bits must be provided. Furthermore, three sets of $4 \times 10^3$ shift registers and one set of $10^3$ shift registers are required. Assuming that the cycle time is 1 microsecond, the time interval required for scanning the entire words in the memory 9 becomes as long as 10 seconds. Also, since the manufacturing cost per bit of the shift registers 10, 11, 12 and the memory 9 is very high at present, the equipment shown in FIG. 3 is very costly to manufacture.

As is apparent from the foregoing description, the application of OCR equipment having the pattern classification equipment with conventional construction to the recognition Chinese characters has disadvantages such as the high cost involved and the relatively long processing time.

SUMMARY OF THE INVENTION

It is one object of this invention to provide a new and improved pattern classification equipment or system for use in the recognition of various patterns such as Chinese characters free from the above-mentioned disadvantages of the prior art equipment.

The pattern classification equipment of this invention is characterized in that, with respect to an $n$-dimensional time sequential pattern consisting of $n$ binary state-dependent variables observed at a predetermined time interval, each of the binary state-dependent variables is multiplied by a weighting coefficient, the resultant n products are added together, and the result of the addition is quantized, whereby the class or category to which the time sequential pattern belongs is determined.

The pattern classification equipment comprises a scanning type observing means for converting an input pattern on a sheet of a document to be scanned which is divided into n meshes into binary signals as a time sequential input pattern at a predetermined time interval, indicative of whether or not the brightness on each mesh exceeds a threshold level, a sequential access memory having a plurality of memory sections for storing $n$ pairs of positive and negative weighting coefficients and capable of reading out a pair of weighting coefficients so as to correspond to each component of the time sequential input pattern, a plurality of switching means connected to readout terminals corresponding to the plurality of memory sections of the memory and controlled by the output of the observing means, a counter connected to the plurality of switching means, a quantizer connected to the counter and composed of a comparator and a polarity detector, a timing control means for generating timing signals for controlling the operation of each of the above-mentioned means, whereby the corresponding switching means operates so that the positive or negative weighting coefficient may be given to the counter depending on the binary output signal 1 or 0 from the observing means.

The pattern classification equipment of this invention has the following outstanding advantages:

1. No shift registers are required for storing the input pattern. Also, the weighted sum for the input pattern can be obtained within a time interval less than the storage time.

2. A less expensive sequential access memory is utilized in the equipment. The OCR equipment incorporating the pattern classification equipment of this invention becomes less costly to manufacture as compared with the conventional OCR equipment having the random access type core memory.

3. Because the weighting coefficients are stored as a ratio of the numbers of 1 and 0, the performance can scarcely be affected by a one-bit memory error. In addition, the positive and negative weight vectors are stored in pairs, and error checking can be performed based on the fact that the sum of the weighting coefficients of each component is always constant. Thus, the reliability of the equipment can be greatly improved.

4. By employing magnetic bubble domain devices as the sequential access memory, the parallel computation of the weighted sum is easily accomplished. This contributes greatly to the cost reduction, and at the same time, to the increase of the processing speed.

DETAILED DESCRIPTION OF THE DRAWINGS

Figure 4:
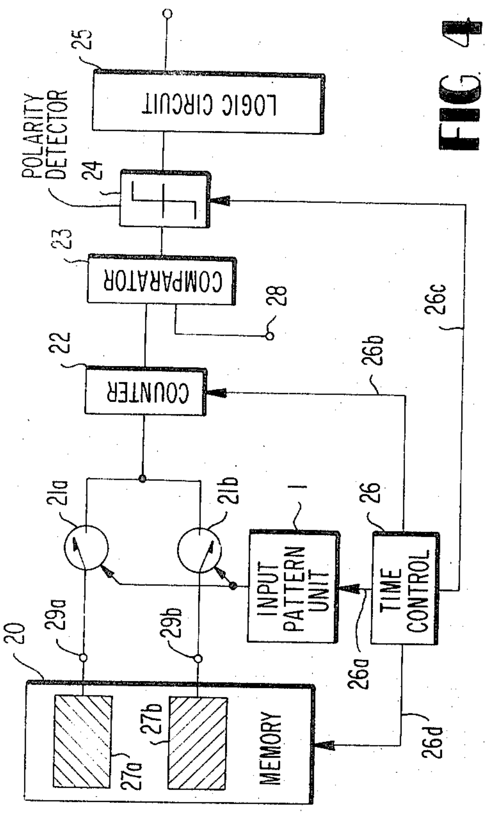
FIG. 4 shows a block diagram of a first embodiment of this invention.

In FIG. 4 which shows a block diagram of a first embodiment of this invention, the pattern classification equipment comprises a sequential access memory 20 for storing the weight vectors $W_1 = (w_{11}, w_{21}, \ldots,$ and $w_{n1})$ and $(W_s - W_1) = (w_s - w_{11}, w_s - w_{21}, \ldots,$ and $w_s - w_{n1})$ in the analogue form in a pair of memory sections 27a and 27b, respectively, switching circuits 21a 21b respectively connected to readout output terminals 29a and 29b corresponding to the memory sections 27a and 27b, a counter 22 connected to the junction of the outputs of the switching circuits 21a and 21b, a comparator 23 connected to the counter 22, a polarity detector 24, a logical processing circuit 25, an input pattern observing unit 1, and a timing control circuit 26. The timing control circuit 26 causes timing control signals for synchronization to be applied to the observing unit 1, the sequential access memory 20, the counter 22, and the polarity detector 24 through signal lines 26a, 26d, 26b and 26c, respectively.

In cases where the memory 20 can store information only digitally (for instance, magnetic drums or magnetic bubble domain devices), $w_s$ binary memory bits are assigned to the components $w_{i1}$ and $w_s - w_{i1}$ ($i = 1, 2, \ldots,$ and $n$) of the weight vectors $W_1$ and $W_s - W_1$ in the sections 27a and 27b, and analogue values corresponding to these components are stored in the memory 20 as the summation of the number of 1. Incidentally, the sum of the number of 1 for the $i$-th component of the positive weight vector and that for the $i$-th component of the negative weight vector always becomes $w_s$, resulting in easily performing memory error checking.

Each of the switching circuits 21a and 21b is switched downward when each component ($x_i$, $i = 1, 2 \ldots,$ and $n$) of the input pattern is 1 and upward when it is 0. Therefore, if the component of the input pattern is 1, the $i$-th component $w_{i1}$ of the weight vector $W_1 = (w_{11}, w_{21}, \ldots,$ and $w_{n1})$ in the section 27a is fed to the counter 22, and if the component of the input pattern is 0 the $i$-th component of the weight vector $W_s - W_1 = (w_s - w_{11}, w_s - w_{21}, \ldots,$ and $w_s - w_{n1})$ in the section 27b, is given to the counter 22. Consequently, the output of the counter 22 becomes equal to the inner product $X * W_1 + \overline{X} * (W_s - W_1)$ (which represents the similarity) at the time when the final component $x_n$ of the input pattern $X = (x_1, x_2, \ldots,$ and $x_n)$ entered into either switching circuit 21a or 21b.

Whether or not the similarity exceeds a certain level can be determined by comparing at the comparator 23 the output of the counter 22 with a predetermined threshold value applied to a terminal 28. When the result of comparison at the comparator 23 is positive, the output of the detector 24 becomes 1. Thus, after the input pattern has been processed, the control circuit generates a signal to reset the counter 22 through the signal line 26b.

It is the most convenient method to determine the threshold value applied to the terminal 28 equal to one half ($1/2n \times 2_s$) of the maximum value which the inner product can take, that is, the value $n$ of the number of components of the input pattern multiplied by the saturated value $w_s$. Incidentally, the alteration of the weight vector $W_1 = (w_{11} w_{21}, \ldots,$ and $w_{n1}$ and $(W_s - W_1) = (w_s - w_{11}, w_s - w_{21}, \ldots,$ and $w_{n1})$ is scarcely required, as a practical matter. As a result, it is not a serious problem, even if the write-in period may require tens of minutes. Even if the alteration of the weight vector $W_1$ or $W_s - W_1$ occurs frequently, it is not difficult to do so because large-scale computers can be used on a time-sharing basis at present.

If several sets of means 27a, 27b, 21a, 21b, 22, 23, and 24 are connected in parallel, a complicated input pattern X can be classified into a plurality of classes. In such a case, weight vectors corresponding to a plurality of classes are stored in the memory 20 and outputs of a plurality of polarity detectors 24 are put together in the circuit 25, whereby the classification into the desired classes is achieved.

Figure 5:
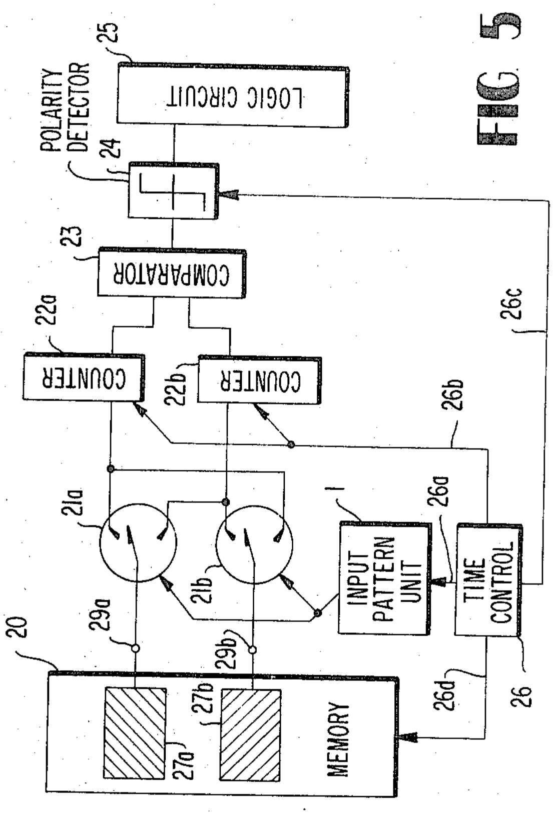
FIG. 5 shows a block diagram of a second embodiment of this invention.

In FIG. 5 which shows a block diagram of a second embodiment of this invention, like elements are designated by like reference numerals as FIGS. 4 and 5. The only difference between the two embodiments resides in providing two counters 22a and 22b instead of a single counter 22 in FIG. 4.

Assuming that each of the switching circuits 22a and 22b is switched to the upper terminal when the component $x_i$ of the input pattern X is 1 and is switched to the lower terminal otherwise, the output of the counter 22a becomes $X * W_1 + \overline{X} * (W_s - W_1)$ in a similar manner to FIG. 4 as soon as the input pattern X has been supplied, whereas the output of the counter 22b becomes $X * W_1 + \overline{X} * (W_s - W_1)$ which substitutes for the predetermined threshold value used in FIG. 4. Therefore, the output of the comparator 23 is expressed as $$X * W_1 - \overline{X} * W_1 + \overline{X} * (W_s - W_1) - X * (W_s - W_1)$$

This choice of which one of these two embodiments of FIGS. 4 and 5 depends on the user. Even though one additional counter is needed in the circuit arrangement of FIG. 5, the latter circuit can exhibit a better performance to cost ratio when stable operation is desired.

Figure 1:
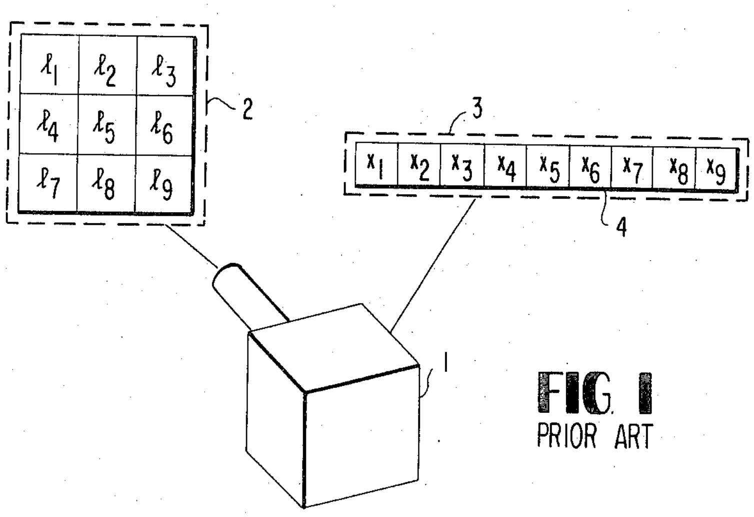
FIG. 1 PRIOR ART
FIG. 1 diagrammatically shows an optical observing means.
Figure 2:
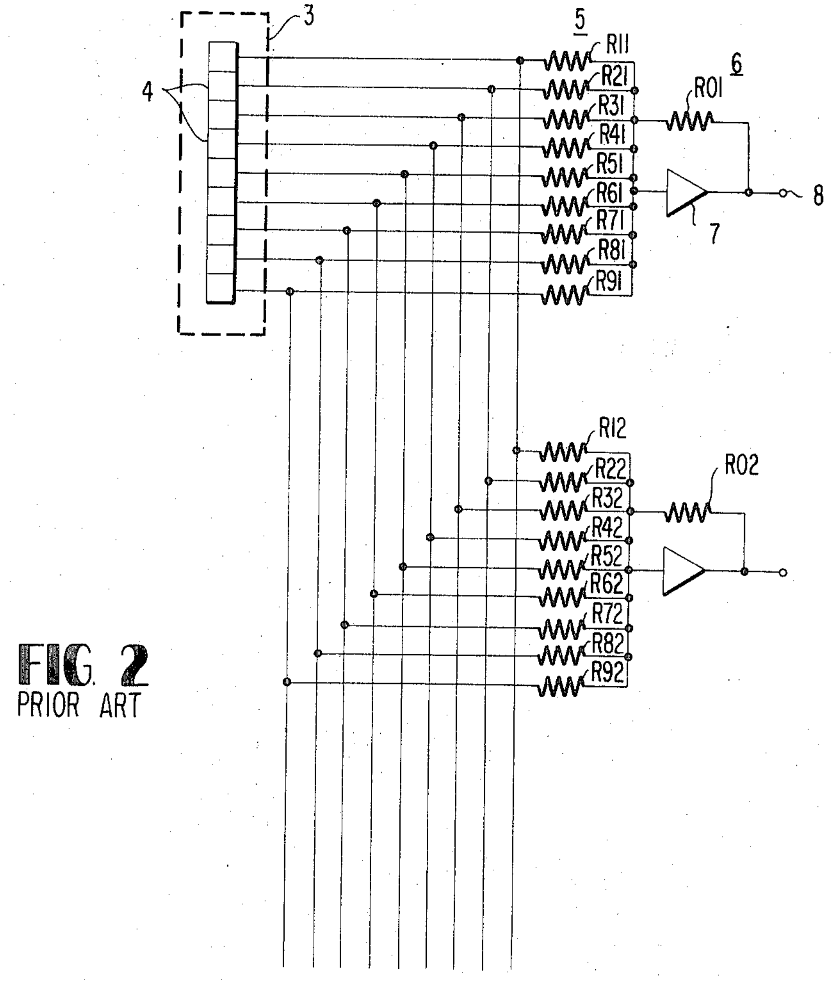
FIG. 2 PRIOR ART
FIG. 2 shows a schematic program of a recognition means for use in a conventional optical character recognition (OCR) equipment.
Figure 3:
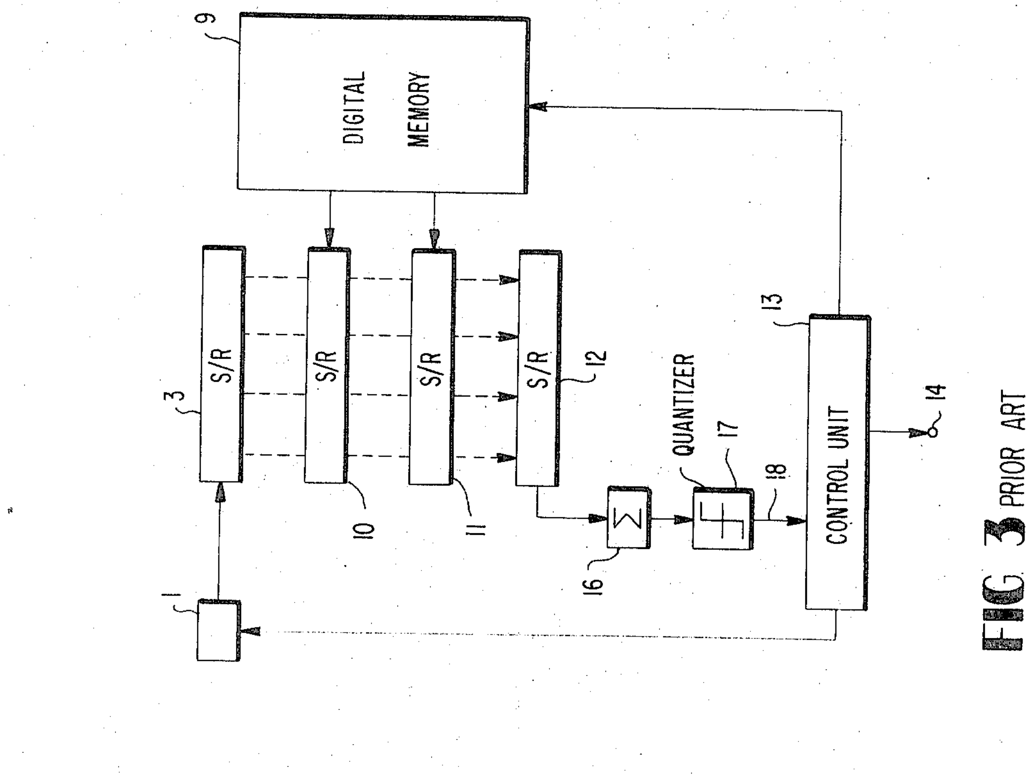
FIG. 3 PRIOR ART
FIG. 3 shows a schematic block diagram of a representative structure of a conventional pattern classification equipment.

The individual functional blocks described in connection with FIGS. 4 and 5 are known in the art. Details of specific preferred magnetic domain circuit implementations of various combinations of the aforesaid functional blocks are disclosed below in connection with FIGS. 6 through 11. However, it should also be noted that the prior art discloses known implementations of the functional blocks in the form of electronic circuitry. As an example, the counters 22 of FIGS. 4 and 6 may be of the type described on pages 1–7 through 1–9 of, "Design of Transistorized Circuits for Digital Computers," by Abraham Pressman, published John F. Rider Publisher, Inc., N.Y., 1959, (see description of FIGS. 1–9 and 1–10). The comparators of FIGS. 4 and 5 may be of the type described on pages 2–32 and 2–33 (see FIGS. 2–31) of the latter-mentioned publication. The polarity detectors of FIGS. 4 and 5 may be of the type disclosed in a paper entitled, "Delay Compensation Concept in Very High Speed Memories," published in "NEC Research and Development," Apr. issue, 1967, (see in particular FIG. 3 on page 132 and FIG. 6 on page 134). The input unit 1 of FIG. 4 may be composed of of the video signal processing circuit disclosed in a paper entitled, "The IBM 1975 Optical Page Reader," published in "IBM Journal of Research and Development," Sept. issue, 1968, (see FIG. 6 on page 350 and FIG. 2 on page 356). Additionally, the pattern classification function of logic circuit 25 is disclosed in the, "Proceedings-Fall Joint Computer Conference," published by The American Federation of Information Processing Societies, 1968, pages 1118 through 1124, (particularly pages 1118 and 1119).

Figure 6:
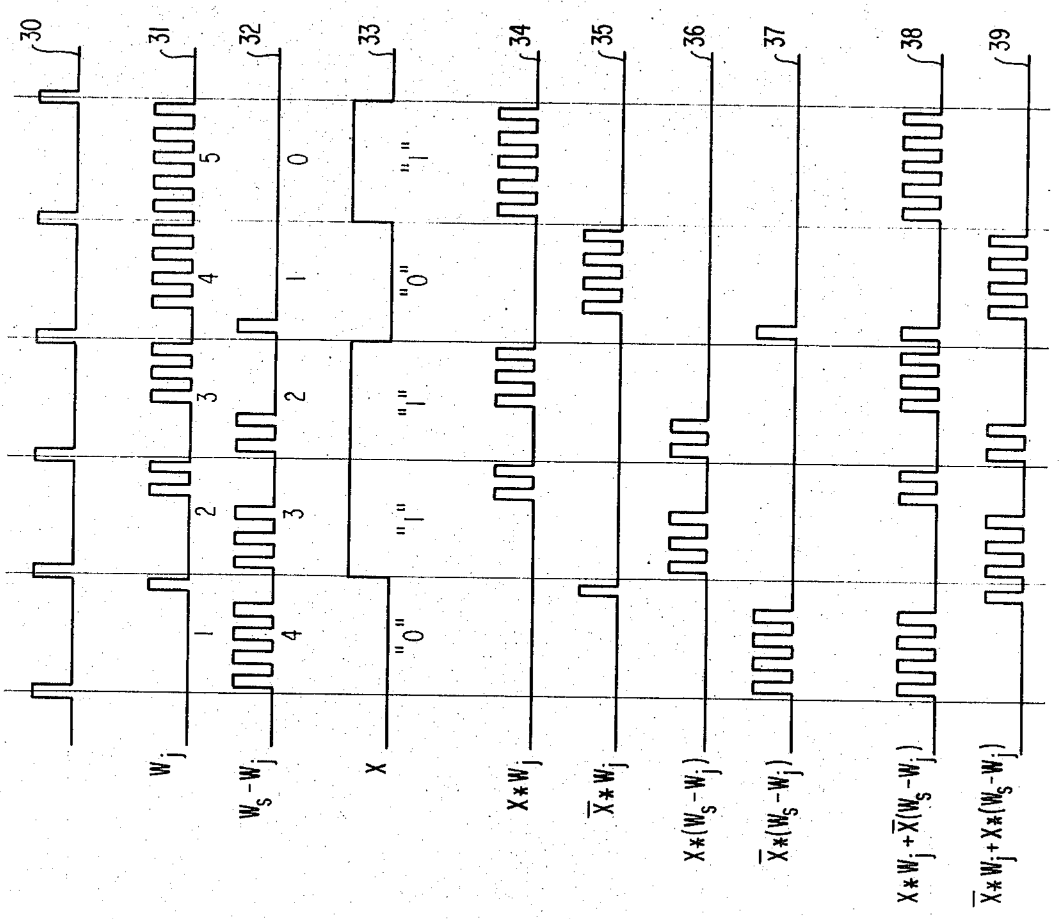
FIG. 6 illustrates how an input pattern X is processed by the equipment shown in FIG. 5.

In FIG. 6 which illustrates the processing operation of the input pattern X having 5 components by the equipment shown in FIG. 5, it is assumed tht the positive weight vector $W_1$ and the negative weight vector $(W_s - W_1)$ are respectively read out from the sections 27a and 27b of the sequential access memory 20 to become pulse trains 31 and 32. Each of these pulse trains is synchronized with clock pulses 30. Assuming further that the input pattern X (a time sequential pattern) applied to the switching circuits 21a and 21b in synchronism with the clock pulses 30 is a pulse train 33, the outputs of the switching circuits 21a and 21b become pulse trains 34, 35, 36 and 37 as illustrated in FIG. 6 in this order. The pulse train 34 is the outcome of the AND operation of the pulse trains 31 and 33. The pulse train 35 is the outcome of the AND operation of the pulse train 31 and the inverted one of the pulse train 33. The pulse train 36 is the outcome of the AND operation of the pulse trains 32 and 33. The pulse train 37 is the outcome of the AND operation of the pulse train 32 and the inverted one of the pulse train 33. The pulse train 38 is the outcome of the wired-OR operation of the pulse trains 34 and 37 to be applied as an input to the counter 22a, while the pulse train 37 is the outcome of the wired-OR operation of pulse trains 35 and 36 to be supplied as the input to the counter 22b.

Under this state, the output of the first counter 22a contains 15 pulses, while the output of the second counter 22b contains 10 pulses. As a result, the output of the comparator 23 contains 5 pulses and the output of the polarity detector 24 is 1.

If the input of the comparator 23 which is to be connected to the counter 22b is replaced by a threshold value $n/2 \times w_s$ (=$0.5 \times 5 \times 5 = 12.5$) equal to that value applied to the terminal 28 in FIG. 4, the output of the comparator 23 becomes +2.5. Although this value is one half of that for the case where the output of the second counter 22b was used, the output is identical so far as the output of the detector 24 is concerned.

Incidentally, each of the numerals indicated under pulses in the pulse trains 31 and 32 denotes the sum of pulses for 1 in each clock period, each numeral representing the analogue value for each component of the positive and negative weight vectors $W_1$ and $W_s - W_1$.

Each numeral indicated under the pulse train 33 shows the state of each component of the input pattern synchronized with the clock pulse train 30.

The memory 20 in FIGS. 4 and 5 may be constructed in the form of the magnetic bubble domain device. If this bubble domain device is employed, the operation of the pattern classification equipment will become more smooth and rational.

Figure 7:
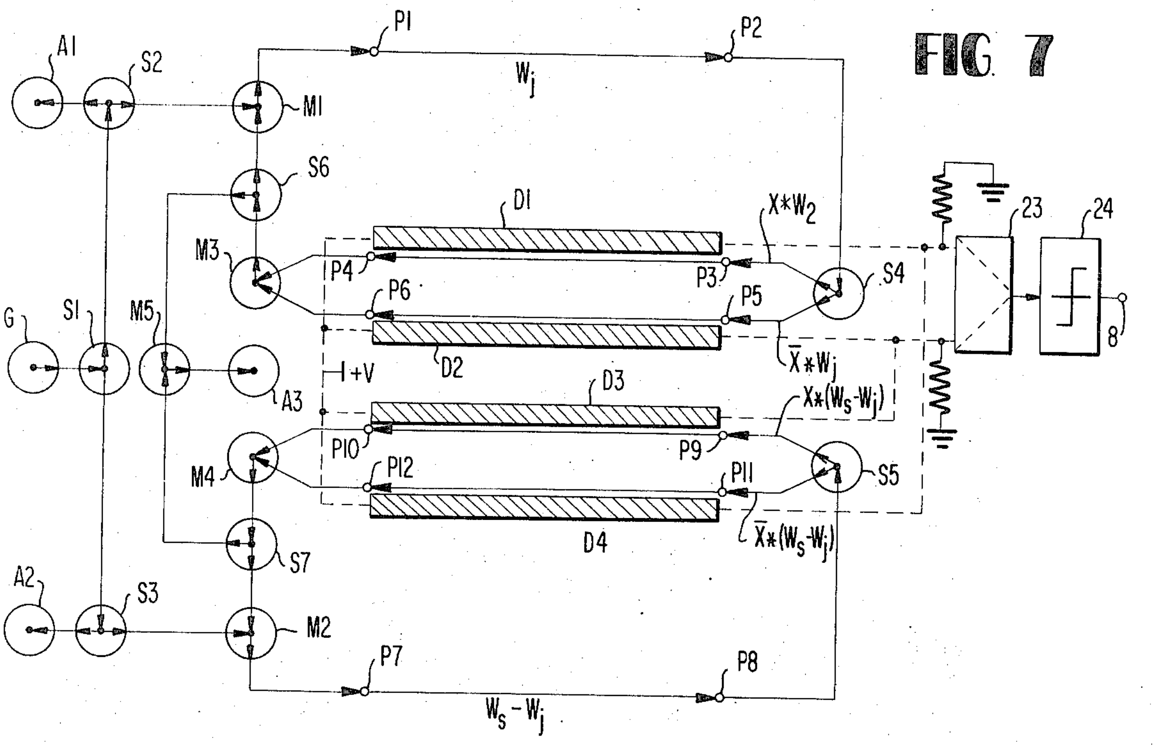
FIG. 7 shows a structural example of the pattern classification equipment in FIG. 5 as exemplified in the form of the magnetic bubble domain device.

FIG. 7 shows a structural example of the pattern classification equipment of FIG. 5 reduced into practical form by the use of the magnetic bubble domain device.

A magnetic bubble domain element has the anisortropic property perpendicular to its plane (or in other words, sheet) and the characteristic which causes a magnetic domain having the magnetized vectors of the opposite polarity to the magnetized vectors of the environment to be moved freely along the plane. Upon application of a rotating magnetic field along the plane, the magnetic domain is partially subjected to a gradient of the magnetic field and is propagated along thin films of permalloy which are prepared on the plane. Incidentally, the magnetic pole of each thin film of permalloy is moved depending on the rotating magnetic field.

FIG. 7 represents paths along which the magnetic domain can be moved. The domain is generated in a circuit G (indicated by a circle) and moves toward a branching circuit $S_1$ (indicated by a circle). Upon application of a control magnetic field of a first phase corresponding to write-in information, the circuit $S_1$ causes the incoming magnetic domain to be moved upward. In the absence of such control magnetic control field, the incoming magnetic domain is permitted to move downward. The magnetic domain appearing from the circuit $S_1$ is directed to a branching circuit $S_2$ or $S_3$ and when there is no control magnetic field of a second phase for write-in applied, then to an absorber circuit $A_1$ or $A_2$. By the control magnetic field of the second phase, the magnetic domains emerging from the circuits $S_2$ and $S_3$ are led to mixing circuits $M_1$ and $M_2$ and are moved to propagation paths $P_1$–$P_2$ and $P_7$–$P_8$.

Thus, two positive analogue values $w_{i1}$ and $(w_s - w_{i1})$, (where $i = 1, 2, 3 \ldots$, and $n$), indicating the weighting coefficients are stored in the paths $P_1$–$P_2$ and $P_7$–$P_8$, respectively as the number of the magnetic domains. The magnetic domains are propagated depending on the rotating magnetic field in the direction shown by an arrow. Therefore, the magnetic domains in the path $P_1$–$P_2$ are moved to a path $P_5$–$P_6$ through a branching circuit $S_4$. Also, if the application of the rotating magnetic field is continued, the domains return to the path $P_1$–$P_2$ again through a mixing circuit $M_3$, a branching circuit $S_6$, and the mixing circuit $M_1$. Similarly, the magnetic domains in the path $P_7$–$P_8$ are permitted to go to a path $P_{11}$–$P_{12}$ through a branching circuit $S_5$, and are restored through a mixing circuit $M_4$, a branching circuit $S_7$ and the mixing circuit $M_2$ to the path $P_7$–$P_8$.

When a control magnetic field of a third phase is applied such that magnetic domains supplied to the circuit $S_4$ are sent to either path $P_3$–$P_4$ or $P_5$–$P_6$ and those fed to a branching circuit $S_5$ are given to either path $P_9$–$P_{10}$ or $P_{11}$–$P_{12}$ depending on the binary state variables $x_i$ ($i = 1, 2, 3 \ldots$, and $n$) of the components of the time sequential pattern, the circuits $S_4$ and $S_5$ function in a similar manner to the switching circuits 21*a* and 21*b* in FIG. 5, respectively. In other words, the total number of the magnetic domains present in the paths $P_3$–$P_4$ and $P_{11}$–$P_{12}$ and that of the magnetic domains present in the paths $P_5$–$P_6$ and $P_9$–$P_{10}$ are equal in value of the outputs of the counters 22*a* and 22*b* in FIG. 5, respectively. By providing magnetic resistance elements $D_1$, $D_2$, $D_3$, and $D_4$ for the detection of the magnetic domains along the paths $P_3$–$P_4$, $P_5$–$P_6$, $P_9$–$P_{10}$, and $P_{11}$–$P_{12}$ and interconnections as shown by the dashed lines, the weighted sum $X * W_1 + \overline{X} * (W_s - W_1)$ is available from the detector 23. In this case, the available weighted sum is equal to the summation of the products for all components after each product was obtained by the multiplication of the binary state-dependent variables $x_i$ and $\overline{x}_i$ ($i = 1, 2, 3 \ldots$, and $n$) of each component of the time sequential pattern by the respective weighting coefficients $w_{i1}$ and $w_s - w_{i1}$ ($i = 1, 2, \ldots$, and $n$). The weighted sum is fed to the polarity detector 24 and is used as an information bit for determining the category of the input pattern. Upon detection of the weighted sum, the trains of the analogue values indicated by the number of the magnetic domains are restored through the mixing circuits $M_3$ and $M_4$ to the paths $P_1$–$P_2$ and $P_7$–$P_8$, respectively. Consequently, the propagation paths $P_1$–$P_2$ and $P_7$–$P_8$ correspond respectively to the sections 27*a* and 27*b* of the sequential access memory 20.

The circuits $S_1$, $S_2$, $S_3$, $S_6$ and $S_7$ are used to write the weighting coefficients in the memory 20. More specifically, when the control magnetic field of the second phase is given, the circuits $S_2$ and $S_3$ introduce the magnetic domains sent from the circuit $S_1$ into the circuits $M_1$ and $M_2$, respectively. If the branching circuits $S_6$ and $S_7$ are so set that the magnetic domains appearing from the circuits $M_3$ and $M_4$ are fed to a mixing circuit $M_5$, the magnetic domains indicating analogue values to be sent back to the paths $P_1$–$P_2$ and $P_7$–$P_8$ are supplied to an absorber circuit $A_3$ via the circuit $M_5$ and are erased therein. In their place, magnetic domains representing new analogue values are given into the paths $P_1$–$P_2$ and $P_7$–$P_8$ respectively through the circuits $M_1$ and $M_2$. In such a way, the rewriting operation of the weight vector $W_1$ is performed.

characteristics of such a magnetic bubble domain element are described in many technical pages published in, for instance, "Scientific American," June issue, 1971, pages 71 to 90. Therefore, detailed description of the properties will not be given here for simplicity.

Figure 8:
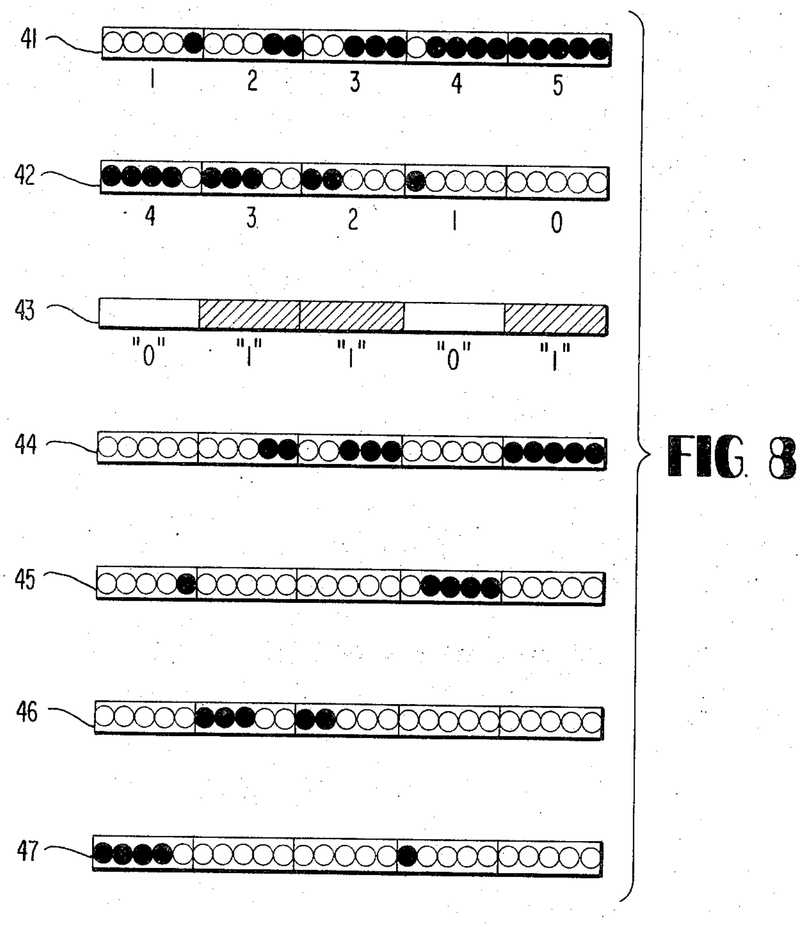
FIG. 8 shows a diagram for explaining how the input pattern is processed by the equipment of FIG. 7.

FIG. 8 represents how the input pattern is processed by the device of FIG. 7. This operation essentially corresponds to that illustrated in FIG. 6.

More specifically, an arrangement 41 of the magnetic domains indicates a state of the magnetic domains present in the path $P_1$–$P_2$ and an arrangement 42 shows a state of the magnetic domains present in the path $P_7$–$P_8$. A band 43 indicating the presence or absence of the control magnetic field of the third phase for changing the direction of flow of the magnetic domains from downward to upward in the circuits $S_4$ and $S_5$ corresponds to the input pattern $X = (x_1, x_2 \ldots$, and $x_n)$. If the control magnetic field of the third phase depending on the input pattern X shown by the band 43 is applied, the magnetic domains present in the paths $P_1$–$P_2$ and $P_7$–$P_8$ are sent to the paths $P_3$–$P_4$ or $P_5$–$P_6$ and the paths $P_9$–$P_{10}$ or $P_{11}$–$P_{12}$, respectively through the circuits $S_4$ and $S_5$. Arrangements of the magnetic domains 44, 45, 46, and 47 show the final state of the magnetic domains present respectively in the paths $P_3$–$P_4$, $P_5$–$P_6$, $P_9$–$P_{10}$, and $P_{11}$–$P_{12}$. Incidentally, the numbers of the magnetic domains contained in the arrangements 44, 45, 46, and 47 are 10, 5, 5, and 5, respectively.

The sum of the magnetic domains +15 in the arrangements 44 and 47 and that of the magnetic domains +10 in the arrangements 45 and 46 are supplied to the comparator 23 by the magnetic resistance elements $D_1$, $D_2$, $D_3$, and $D_4$. Then, the voltage signal corresponding to the difference +5 is obtained from the comparator 23. The output is given to the polarity detector 24 and is converted into a binary signal 1.

Referring to FIG. 8, a black circle indicates the presence of the magnetic domain and a white circle shows the absence of the domain. The numeral indicated below the arrangements 41 and 42 represent the numbers of the magnetic domains present in each block and, at the same time, the analogue value (weighting coefficient) for each component of the positive and negative weight vector.

Figure 9:
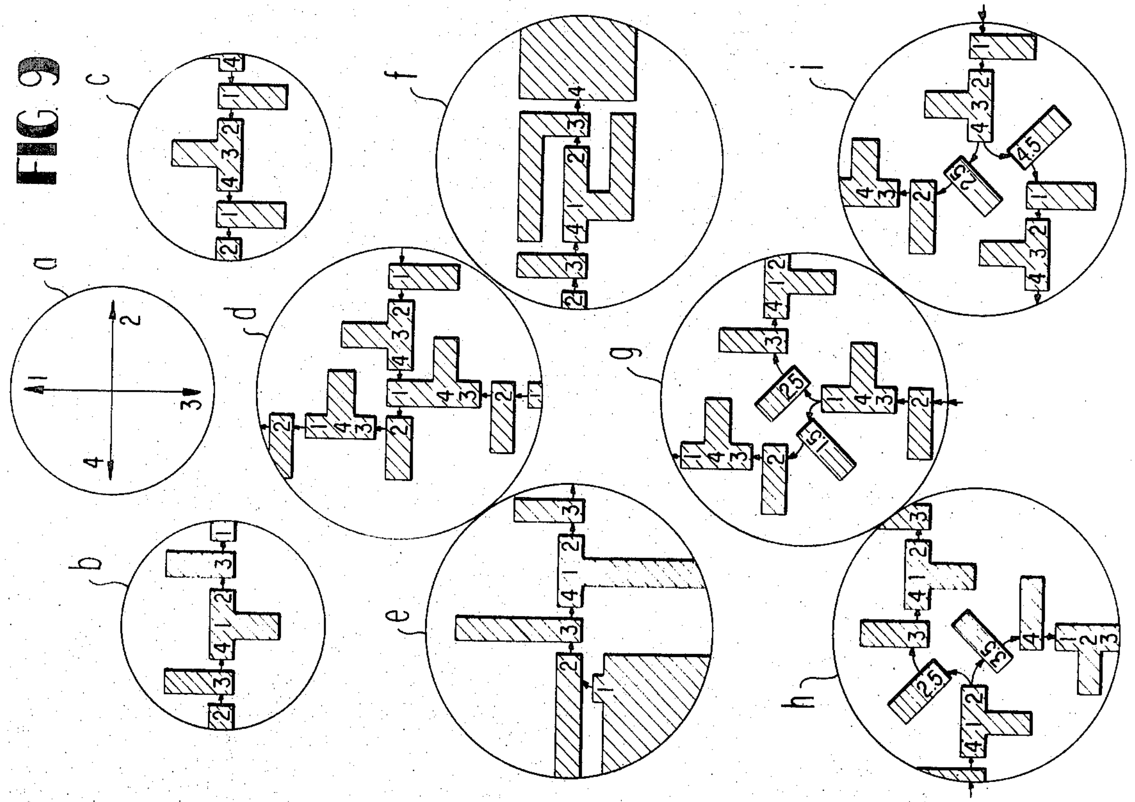
FIG. 9 shows a diagram for illustrating thin film patterns of permalloy in various parts of the device shown in FIG. 7.

In FIG. 9 which illustrates various patterns of thin films of permalloy for the magnetic bubble domain device shown in FIG. 7, block *a* indicates the order of the application of the rotating magnetic field to the magnetic bubble domain element. Blocks *b* and *c* represent the order in which magnetic domains move on the T- and I-shaped thin films of permalloy, respectively. This order denotes also the order of the movement of a magnetic pole generated on a thin film of permalloy by the rotating magnetic field shown in the block *a*. In the block *b*, a magnetic domain moves from left to right according to numerals, whereas in the block *c*, it moves from right to left.

This arrangement of the T- and I-shaped permalloy films is used for the propagation paths $P_1$–$P_2$, $P_7$–$P_8$, $P_3$–$P_4$, $P_5$–$P_6$, $P_9$–$P_{10}$, and $P_{11}$–$P_{12}$ shown in FIG. 7.

Block *d* shows the mixing circuits $M_1$ through $M_5$ in FIG. 7. As illustrated, magnetic domains are led towards the upper side whether they arrive from the lower side or the right side. In FIG. 7, no magnetic domains are permitted to appear simultaneously from both the lower and right sides, such a simple circuit shown in FIG. 7 serves sufficiently for practical purposes.

Block *e* indicates the generator circuit G shown in FIG. 7. It will be understood that the magnetic domains are produced one by one from the projected portion of the large permalloy film illustrated in the left bottom part in coincidence with the period of the rotating magnetic field and that these magnetic domains are sent to the T- and I-shaped permalloy thin films shown in the right side. Block *f* indicates the absorber circuits $A_1$, $A_2$, and $A_3$. In these circuits, the magnetic domains given from the left are sent to the large permalloy thin film at the right end and erased. Blocks, *g*, *h*, and *i* correspond to the branching circuit $S_1$, the circuits $S_2$, $S_3$, $S_6$ and $S_7$, and the circuits $S_4$ and $S_5$, respectively. Upon application of a control magnetic field of suitable phase, the magnetic domains sent from one direction can be moved in another direction different from the direction in which these magnetic domains are propagated depending on the normal rotating magnetic field. In particular, the circuit $S_1$ corresponding to the block *g* causes a magnetic domain entering from the bottom side to proceed to the right side by the control magnetic field of the first phase, (i.e., the magnetic field in the third direction superimposed on the rotating magnetic field from the external as soon as the rotating field varies from the first to the second direction). In the branching circuits $S_2$, $S_3$, $S_6$, and $S_7$ corresponding to the block *h*, the magnetic domain supplied from the left side is propagated to the lower side depending on the control magnetic field of the second phase, (i.e., the magnetic field in the fourth direction superimposed on the rotating magnetic field from the external immediately after the rotating field varies from the second to the third direction). In the circuits $S_4$ and $S_5$ corresponding to the block *i*, the magnetic domain from the right side is moved upward depending on the control magnetic field of the third phase, (i.e., the magnetic field in the second direction superimposed on the rotating magnetic field from the external at the moment the rotating field changes from the fourth to the first direction).

In the absence of the control magnetic field, the magnetic domains are propagated from the lower to the upper side in the block *g*, from the left to the right side in the block *h*, and from the right to the left side in the block *i*, respectively. Incidentally, the timing of the rotating magnetic field and the control magnetic fields of the 1st, 2nd, and the 3rd phases is controlled by the timing control circuit 26 in FIG. 5.

Figure 10:
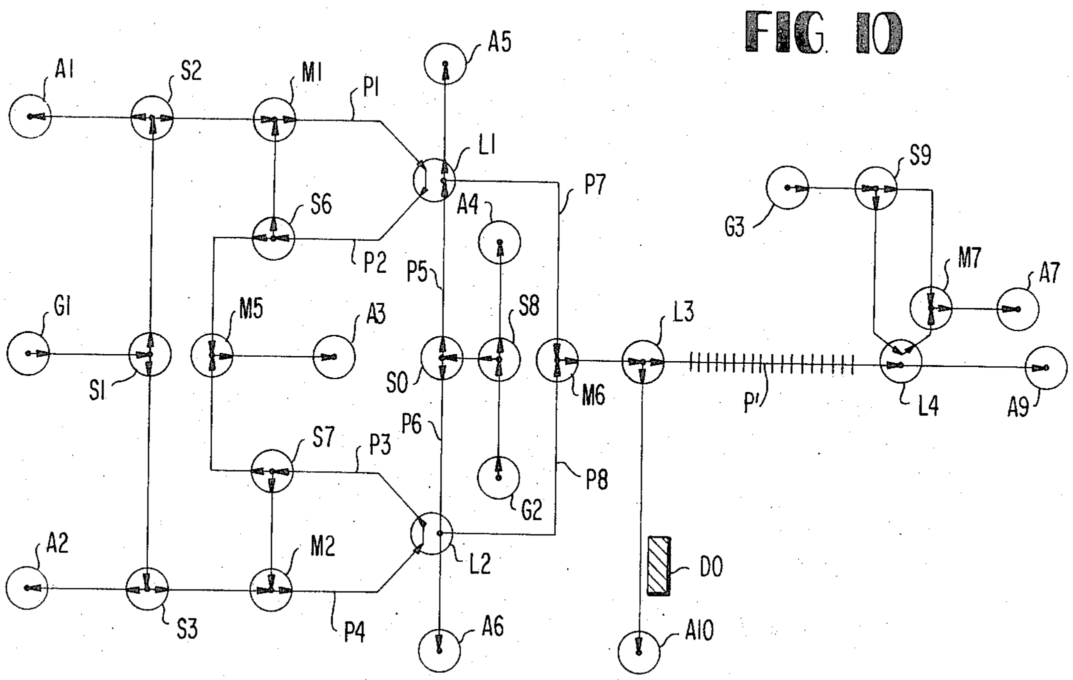
FIG. 10 shows a structural example of the equipment of FIG. 4 as exemplified in the form of the magnetic bubble domain device.

In FIG. 10 which shows a structural example of the pattern classification equipment shown in FIG. 4 as embodied in the form of the magnetic bubble domain device, it should be noted that only one pattern classification equipment is indicated.

The absorber circuits $A_1$, $A_2$ and $A_3$, a generator $G_1$, the branching circuits $S_1$, $S_2$, $S_3$, $S_6$ and $S_7$, and the mixing circuits $M_1$, $M_2$, and $M_5$ represent the parts used for writing in weighting coefficients as described in FIG. 7. Each of the long propagations paths $P_1$ and $P_2$, and $P_3$ and $P_4$ is included in a closed loop and stores the magnetic domains sent through the mixing circuit $M_1$ or $M_2$. More definitely, the analogue weighting coefficient ($w_{il}$, $w_s - w_{il}$, ($i = 1, 2, \ldots$, and $n$) of each component of the weight vector $W_1$ or $(W_s - W_1)$ is stored in the form of the number of magnetic domains contained in a certain block. This operation is explained in conjunction with FIG. 8.

When the downward flow of magnetic domains in a branching circuit $S_0$ is changed to an upward flow by the generation of the control magnetic field of the third phase depending on information of each component $x_i$ ($i = 1, 2, 3, \ldots$, and $n$), of the input pattern, the magnetic domains are transmitted to the propagation paths $P_5$ and $P_6$ in accordance with the input pattern $X = (x_1, x_2, \ldots$, and $x_n)$ and its complement $\overline{X} = (\overline{x}_1, \overline{x}_2, \ldots$, and $\overline{x}_n)$, respectively. A branching circuit $S_8$ guides the magnetic domains emerging from a generator $G_2$ to an absorber circuit $A_4$ by the use of a reset signal, or otherwise (during the set period) to the branching circuit $S_0$. The reset signal necessary for resetting the content of the counter is applied from the circuit 26 in FIG. 4 as the control magnetic field of the fourth phase.

The timing of the application of the input pattern and the reset signal is predetermined by the circuit 26 shown in FIG. 4 so that the first components $w_{11}$ and $w_s - w_{11}$ of the weight vectors $W_1$ and $(W_s - W_1)$ arrive at logic circuits $L_1$ and $L_2$ simultaneously with the arrival of the first component $x_1$ of the input pattern at the logic circuit $L_1$ or $L_2$. As a result, the product $x_i \cdot w_{il}$ of the *i*-th component $w_{il}$, ($i = 1, 2, \ldots$, and $n$), of the *j*-th weight vector $W_1$ and the *i*-th component $x_i$, $i = 1, 2, \ldots$, and $n$, of the input pattern X is sent to the path $P_7$ as the number of the magnetic domains, whereas the product of $(w_s - w_{il})$ and $\overline{x}_i$ is given to the path $P_8$.

It is to be noted that $w_s$ denotes the maximum number of the magnetic domains which each block can include and that $\overline{x}_i$ is 1 for $x_i = 0$.

The arrangements of the magnetic domains in the propagation paths $P_7$ and $P_8$ correspond to the arrangements 44 and 47 in FIG. 8, respectively. In the logic circuit $L_1$, the magnetic domains which proceed from the path $P_5$ to an absorber circuit $A_5$ are directed to the path $P_7$, when the domains come into this circuit $L_1$ simultaneously from the paths $P_5$ and $P_1$ by utilizing the repulsive force between the magnetic domains appearing from the two paths. If magnetic domains appear neither from path $P_5$ nor from $P_1$, the magnetic domains are not sent to the path $P_7$. Therefore, the logic circuit $L_1$ can perform the AND function. Also, the logic circuit $L_2$ operates in the same manner as the circuit $L_1$. A mixing circuit $M_6$ delivers the magnetic domains entering from the paths $P_7$ and $P_8$ to a logic circuit $L_3$.

The weighted sum for the device of FIG. 10 can be calculated in almost similar manner to the circuit of FIG. 4. The sections 27*a* and 27*b* of the memory 20 correspond to the paths $P_1$ and $P_2$, $P_3$ and $P_4$ in FIG. 10, respectively. Furthermore, the switching circuits 21*a* and 21*b* correspond respectively to the logic circuits $L_1$ and $L_2$ in FIG. 10. Moreover, the wiring-OR of the outputs of the circuits 21*a* and 21*b* in FIG. 4 corresponds to the mixing circuit $M_6$.

A special propagation path P′ in FIG. 10 may be composed of a distributed-bypass type propagation circuit, although it may take the same structure as the ordinary propagation path. During the period in which the magnetic domains are being sent from the circuit $S_6$ to a logic circuit $L_4$, the magnetic domains sent to the path P′ is subjected to the repulsive force in the logic circuit $L_4$ due to those given from a branching circuit $S_9$, and cannot go to an absorber circuit $A_9$.

In the path P′, the magnetic domains applied therein are packed sequentially, beginning with the position immediately preceeding the circuit $L_4$. The packed magnetic domains are not erased by those appearing from the path P′ afterwards and stay in the by-passes provided for the path P′.

It is assumed that the maximum number of the magnetic domains capable of staying in the path P′ existing between the logic circuits $L_3$ and $L_4$ is $\frac{1}{2} \times w_s \times n$, or equal to the threshold value to be applied on the input terminal 28 of the comparator 23 in FIG. 4. Then, the magnetic domains in the logic circuit $L_3$ go to an absorber circuit $A_{10}$ due to the repulsive force exerted from the domains present in the path P′ as soon as the number of the magnetic domains proceeding to the circuit $L_3$ from the circuit $M_6$ during the set period exceeds the value $\frac{1}{2} \times w_s \times n$. By installing a magnetic domain detector $D_0$ (utilizing the Hall effect) on a path between $L_3$ and $A_{10}$, the presence or absence of magnetic domains can be detected. Whether the output of the magnetic domain detector $D_0$ is 1 or 0 corresponds to whether the output of the polarity detector 24 in FIG. 4 is 1 or 0.

The reset signal has the function of altering the flow of the magnetic domains not only for the circuit $S_8$, but also for the circuit $S_9$. If the reset signal is applied, the magnetic domains from a generator $G_3$ are propagated straight in the circuit $S_9$ to an absorber circuit $A_7$ via a mixing circuit $M_7$, otherwise the magnetic domains proceed to the logic circuit $L_4$ from the circuit $S_9$.

While there are no magnetic domains incoming from the circuit $S_9$ with the reset signal applied, the magnetic domains present in the path P′ are given to the circuit $A_9$. At the same time, the magnetic domains cannot proceed from the circuit $S_8$ to the circuit $S_0$, with the result that no magnetic domains flow to the path P′. Therefore, no magnetic domains will be present in the path P′.

Since the circuits $S_8$ and $S_9$ in each of which the direction of flow of the magnetic domains is changed by the control magnetic field of the fourth phase have a strong resemblance to the permalloy patterns shown in the blocks *g* and *h* in FIG. 9, a detailed description of these circuits will not be given here. Furthermore, the structure of the logic circuits $L_1$ and $L_2$ can be easily inferred from the manner of repulsion between the magnetic domains in block 59 or 58 as will be described referring to the particular logic circuit shown in FIG. 11. Therefore, the logic circuits $L_1$ and $L_2$ are not illustrated in detail. The branching circuit $S_0$ can be realized by a permalloy pattern shown in the block *i* in FIG. 9.

Figure 11:
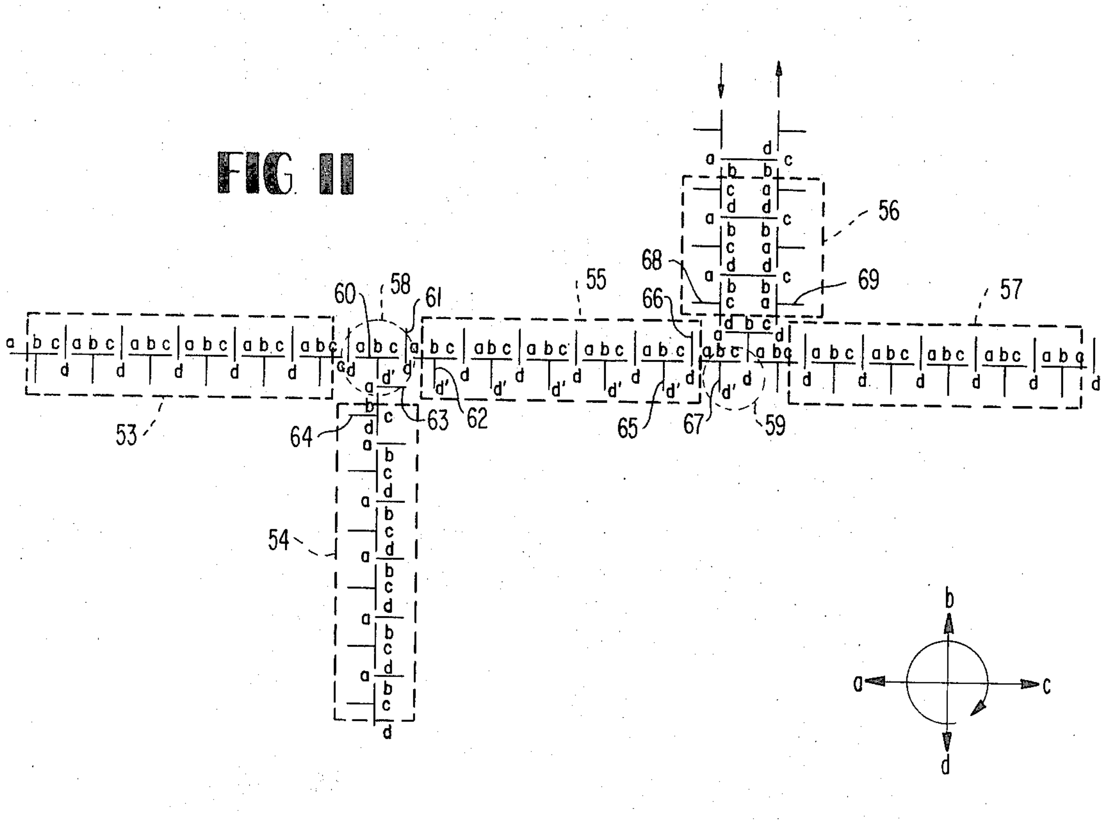
FIG. 11 shows a diagram for explaining in detail the operation of a particular propagation path P' shown in FIG. 10.

In FIG. 11 which represents a diagram of the propagation path P′ of FIG. 4 in detail, the path P′ is employed to perform the function of quantization by only T- and I-shaped thin films of permalloy. In the drawings, the notations at the end points of the T- and I-shaped permalloy films indicate the time points at which the bubble domains become stable. These time points correspond to those *a, b, c,* and *d* for the four divisions of each period of the rotating magnetic field.

In case where no magnetic bubbles are sent to a propagation path 56, the bubbles are moved to a propagation path 57 from a propagation path 53 through a special propagation path 55 (P′) following the route *a, b, c, d, a, b, c, d,* . . . (note = unprimed). In the presence of the bubble domains in the path 56, the domains on a T-shaped thin film 67 located subsequent to the path 55 are repelled back to the portion *d′* (note = primed) of the thin film 67 by bubble domains proceeding to T-shaped thin film 69 from T-shaped thin film 68 in the path 56 at the time point D in a logic circuit 59 ($L_4$). Following this phenomenon, bubble domains to be moved to the portion *d* of an I-shaped thin film 66 from a T-shaped thin film 65 are repelled back to the porton *d′* of T-shaped thin film 65. When the path 55 (P′) is filled with the bubble domains, these bubble domains stay at the positions *a, b, c,* and *d′* on each T-shaped thin film, maintaining their rotation. A logic circuit 58 ($L_3$) causes, at the time point *d*, the flow of the bubble domains directed to the portion d of I-shaped thin film 61 on the right side of T-shaped thin film 60 to change towards I-shaped thin film 63 and T-shaped thin film 64 through the portion *d′* of the thin film 60 due to the repulsive force exerted from those bubble domains that are repelled back to the portion *d′* of the T-shaped thin film 62. As a consequence, the presence or absence of the bubble domains passing through a propagation path 54 can be detected. Thus, the detected output demonstrates that the number of the bubble domains passing through the path 54 during the set period is larger than the threshold value.

As has been mentioned above, this invention permits the inner product of the positive and negative weight vectors stored in the (sequential access) memory 20 to be obtained from the output without storing even once the input pattern X (the time sequential pattern) which is applied through the scanning type observing unit into the shift registers. This eliminates the inconvenience that both manufacturing cost and processing time increase rapidly with the increase in the number of dimensions or mask patterns of the input pattern.

The pattern classification equipment of this invention embodied in the form of the magnetic bubble domain device has the following advantages:

1. Both the positive and negative weight vectors can be written in at a stroke by using one of the weight vectors;

2. Parallel calculation of a plurality of weighted sums can be performed, enabling the input pattern to be applied in the form of the control magnetic field to a plurality of switching circuits;

3. The weighting coefficients of the mask pattern can be altered with ease;

4. The memory contents in the absence of the driving power are not destroyed and hence, nondestructive readout operation can be permanently carried out;

5. Quantization of the weighted sum is accomplished by the special propagation path having simple structure; and 6. The equipment is small in size and weight regardless of the increase in the number of dimensions of the input pattern or of mask patterns.

What is claimed is:

1. A pattern classification equipment adapted to determine the classification of incoming $n$-dimensional time-sequential pattern composed of $n$ binary state-dependent variables, by giving weighting coefficients to said variables, summing up the weighted variables, and quantizing the summation result, characterized by comprising: a scanning-type photo-electric conversion means for sequentially converting into a binary signal an input pattern on a sheet of document divided into $n$ meshes, so that brightness of each mesh may be translated into two values of said binary signal through the successive comparison of said brightness with a reference brightness; a sequential access memory having a plurality of memory sections for storing $n$ pairs of positive and negative weighting coefficients, said memory being adapted to read out one pair from among the $n$ pairs of said positive and negative weighting coefficients in one-to-one correspondence with each component of the time-sequential input pattern; a plurality of switching means connected to readout terminals of said memory sections and controlled by the output of the photo-electric conversion means; a counter connected to the switching means; a quantizer connected to the counter and composed of a comparator and a polarity detector; and means for generating timing signals for controlling each of all the aforementioned means; whereby the corresponding switching means operates so that the positive or negative weighting coefficient may be sent to the counter depending on the binary output signal 1 or 0 from the photo-electric conversion means.

2. A pattern classification equipment according to claim 1 having first and second counters in place of the above-mentioned single counter, whereby all of the switching means operate so that the positive and negative weighting coefficients are sent respectively to the first and second counters depending on the binary output signal 1 from the photo-electric conversion means and vice versa depending on the signal 0.

3. A pattern classification system adapted to classify $n$-dimensional patterns represented by $n$ sequential binary components $x_1 \ldots x_n$, said system comprising, a. means for storing a plurality of pairs of $n$-dimensional weighting coefficients $W_j$ and $W_{s-j}$, where $W_j$ is a positive weighting coefficient composed of n components $w_{j1}, w_{j2}, w_{j3}, \ldots w_{jn}$; $W_s - W_j$ is the corresponding negative weighting coefficient composed of n components $(w_s - w_{j1})$, $(w_s - w_{j2})$, . . . $(w_s - w_{jn})$; $w_s$ is the sum of any two corresponding components of a pair of positive and negative weighting coefficients, b. means associated with each said stored pair responsive to weighting components applied thereto for accumulating said weighting components and forming a sum thereof, c. switching means associated with said stored pairs between said storing means and said accumulating means, and being responsive to each said components $x_i$ of said pattern for applying either $w_{ji}$ or $(w_s - w_{ji})$ to said accumulating means depending on whether $X_i$ has a first or second binary value, and d. threshold means associated with each said accumulating means, for providing an indication whether said sum exceeds a threshold value applied to said threshold means.

4. A pattern classification system as claimed in claim 3 further comprising means associated with each said stored pair for developing a threshold value, said latter means comprising, a. second accumulating means for accumulating weighting components applied thereto, and b. second switching means between said storage means and said second accumulating means and being responsive to each said component $x_i$ of said pattern for applying to said second accumulating means the other of said components $w_{ji}$ or $(w_s - w_{ji})$ from that which is applied to said first accumulating means by said first switching means, whereby the sum in said second accumulating means is said threshold value.

5. A pattern classification system as claimed in claim 3 wherein said means for storing each pair of positive and negative weighting coefficients comprises, first and second magnetic domain storage paths, said first storage path adapted to retain a plurality of sequentially arranged groups of magnetic domains, the groups corresponding respectively to components of $W_j$ and the number of domains in any group $i$ representing the value of components $w_{ji}$, said second storage path adapted to retain a plurality of sequentially arranged groups of magnetic domains, the groups corresponding respectively to components of $W_s - W_j$ and the number of domains in any group $i$ representing the value of components $w_s - w_{ji}$.

6. A pattern classification system as claimed in claim 5 wherein said first switching means comprises, a. means for generating a continuous stream of magnetic domains, b. a first domain diverting means having one input and two output paths for diverting domains appearing at said input path to said first output path in response to a particular time-phase external magnetic field and for diverting said domains to said second path in the absence of said particular time-phase external magnetic field, wherein the binary value of each $x_i$ is represented by the presence or absence of said particular time-phase external magnetic field, c. a pair of magnetic domain repulsion diverting means located respectively adjacent said first and second stored paths for applying domains appearing at an input thereof to said accumulating means only when a domain in said adjacent storage path is in a position to repulse said input domain, and d. means to cause said domains in said paths to circulate in synchronism with the generation of domains by said generating means, e. said generating means, said domain diverting means, and said domain repulsion diverting means being arranged on a material capable of holding magnetic domains, the arrangement being such that each generated domain is applied to the input of said first diverting means and is diverted to one or the other of said repulsion diverting means where it is repulsed towards said accumulating means if a domain is circulating through a location in said storage path adjacent said repulsion diverting means at the same time said generated domain is at said repulsion diverting means.

7. A pattern classification system as claimed in claim 6 wherein said accumulating means and said threshold means comprises, a domain detection, a magnetic domain stacking path adapted to store domains in stacked arrangement as they are applied to an input thereof, said stacking path being filled when no further domains can be stored therein, means for applying the domains from said repulsion diverting means to the input of said domain stacking path whereby said domains enter said path when said path is not full and are repulsed to said domain detector when said stacked path is filled.

8. A pattern classification system as claimed in claim 4 wherein said storing means comprises, a. a first magnetic domain storage path for storing $n$ groups of magnetic domains corresponding respectively to an $n$-component positive weighting coefficient, where the number of domains in each group corresponds to the value of the component, and b. a second magnetic domain storage path for storing $n$ groups of magnetic domains corresponding respectively to an $n$-component negative weighting coefficient, where the number of domains in each group corresponds to the value of the component.

9. A pattern classification system as claimed in claim 8 wherein said first accumulating means comprises, a. a third magnetic domain storage path arranged to form a closed loop domain path with said first path, b. a fourth magnetic domain storage path arranged to form a closed loop domain path with said second path, whereby domains entering said third and fourth paths from said first and second paths, respectively, are effectively accumulated, and c. magnetic domain detecting means adjacent said third and fourth paths for forming a signal representing the total number of domains in said third and fourth paths.

10. A pattern classification system as claimed in claim 9 wherein said second accumulating means comprises, a. a fifth magnetic domain storage path arranged to form a closed loop domain path with said first path and arranged as an alternate path to said third path, b. a sixth magnetic domain storage path arranged to form a closed loop domain path with said second path and arranged in an alternate path to said fourth path, whereby domains entering said fifth and sixth paths from said first and second paths, respectively, are effectively accumulated, and c. second magnetic domain detecting means adjacent said fifth and sixth parts for forming a signal representing the total number of domains in said fifth and sixth paths.

11. A pattern classification system as claimed in claim 10 wherein said first and second switching means comprises, a. a first domain switch, located between the output of said first path and the inputs to said third and fifth paths, and responsive to magnetic time-phase vectors representing the values of said components $x_i$ for diverting each group of domains representing $w_{ji}$ from said first path to either said third or said fifth path depending on the value of $x_i$, and b. a second domain switch, located between the output of said second path and the inputs to said fourth and sixth paths, and responsive to magnetic time-phase vectors representing the values of said components $x_i$ for diverting each group of domains representing $(w_s - w_{ji})$ from said second path to either said fourth or said sixth path depending on the value of $x_i$.

12. A magnetic domain circuit of the type comprising a plurality of permalloy thin film elements of the surface of a material capable of holding magnetic domains and a rotating planar magnetic field adapted to rotate the poles of said permalloy elements to cause movement of domains in direction controlled by the shape and groupings of said elements, the improvement being the particular arrangement of elements to perform a pattern classification weighting function and comprising, a. a first domain circulating path formed by said elements for circulating a plurality of domains through a first domain point, b. a second domain circulating path formed of said elements for circulating a plurality of domains through a second domain point, c. a first repulsion diverting means formed of said elements and positioned adjacent said first domain point for transferring domain applied to the input thereof to a first output in the absence of a domain at said first domain point and for diverting said domain applied to the input to a second output thereof when a domain is present at said first domain point, d. a second repulsion diverting means formed by said elements and positioned adjacent said second domain point for transferring domain applied to the input thereof to a second output in the absence of a domain at said second domain point and for diverting said domain applied to the input to a second output thereof when a domain is present at said second domain point, e. domain generating means formed from said elements, f. switching means formed from said elements and responsive to an external field in addition to said rotating magnetic field for selectively transferring the domains generated by said generating means to one of said first and second repulsion diverting means, g. a storage path formed from said elements and having an input end and a far end, said storage path being adapted to accept and store a maximum number of domains applied to the input end thereof, h. an alternate path, formed from said elements, adjacent the input end of said storage path, and i. input switching means, formed from said elements, adapted to receive said domains from the second outputs respectively of said first and second repulsive diverting means for transferring said domains to said storage path provided said storage path is not filled to maximum and for transferring said domains to said alternate path when said storage path is filled to maximum.

* * * * *

UNITED STATES PATENT OFFICE
CERTIFICATE OF CORRECTION

Patent No. 3,786,428 Dated January 15, 1974

Inventor(s) Kousuke TAKAHASHI

It is certified that error appears in the above-identified patent and that said Letters Patent are hereby corrected as shown below:

Column 2, line 9, "9-dimensioned" should read -- 9-dimensional --

Column 3, lines 40-45 - delete $\begin{pmatrix} 0.7 \\ 0.7 \\ 0.9 \\ 0.1 \\ 0.8 \end{pmatrix}$ insert $\begin{pmatrix} 0.7 \\ 0.2 \\ 0.9 \\ 0.1 \\ 0.8 \end{pmatrix}$ Column 6, line 9 - delete "1" and insert -- (1) -- line 14 - delete "bits for" and insert -- bits of --

Column 8, line 62 - delete "$2_s$" and insert -- $w_s$ -- line 66 - delete "(" (first occurrence) and insert -- [ -- line 66 - delete "$w_{i1}w_{21}$" and insert -- $w_{i1}$, $w_{21}$ -- line 66 - before and after "=" (second occurrence) insert --] [ -- line 67 - at end of equation insert -- ] --

Column 9, line 28 - delete "X" and insert -- $\overline{X}$ -- (first occurrence)

line 28 - delete "$\overline{X}$" and insert -- X -- (second occurrence)

Column 11, line 20 - delete "$w_{il}$" and insert -- $w_{i1}$ -- (numeral 1)

line 61 - delete "$w_{il}$" and insert -- $w_{i1}$ -- (numeral 1)

Column 12, line 20 - delete "characteristics" and insert -- Characteristics --

UNITED STATES PATENT OFFICE

CERTIFICATE OF CORRECTION

Patent No. 3,786,428 Dated January 15, 1974

Inventor(s) Kousuke TAKAHASHI

It is certified that error appears in the above-identified patent and that said Letters Patent are hereby corrected as shown below:

Page Two

Column 14, line 16 - insert brackets at beginning and end of equation line 16 - delete paraenthesis at beginning of equation line 16 - delete "$w_{il}$" and insert -- $w_{i1}$ --(numeral 1)

line 43 - delete "$w_{il}$" and insert -- $w_{i1}$ -- (numeral 1)

line 44 - delete "$w_{il}$" and insert -- $w_{i1}$-- (numeral 1)

line 47 - delete "$w_{il}$" and insert -- $w_{i1}$ -- (numeral 1)

Column 16, line 22 - delete "D" and insert -- d --

Column 17, line 52 - delete "j" (second occurrence) and insert -- $W_j$ -- line 54 - delete "$w_{jl}$" and insert -- $w_{j1}$ -- (numeral 1)

Column 19, line 53 - delete "parts" and insert -- paths --

Signed and sealed this 17th day of September 1974.

(SEAL)
Attest:

McCOY M. GIBSON JR.
Attesting Officer

C. MARSHALL DANN
Commissioner of Patents